United States Patent
Takahashi (10) Patent No.: US 6,286,195 B1
(45) Date of Patent: Sep. 11, 2001

(54) METHOD OF ASSEMBLING TIRE AND WHEEL RECORDING MEDIUM WHICH RECORDS PHASE ANGLE OPERATING PROGRAM AT THE TIME OF ASSEMBLING TIRE AND WHEEL, AND ASSEMBLY TIRE AND WHEEL UNIT

(75) Inventor: Fumio Takahashi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/263,946

(22) Filed: Mar. 8, 1999

(30) Foreign Application Priority Data

Mar. 6, 1998 (JP) .................................................. 10-055532

(51) Int. Cl.$^7$ .................................................. B23Q 17/00
(52) U.S. Cl. .................. 29/407.1; 29/894.31; 29/407.01; 29/407.05; 73/462; 73/460
(58) Field of Search .......................... 29/894.31, 407.01, 29/407.05, 407.1, 802, 701; 73/462, 459, 146, 479, 460, 484, 483

(56) References Cited

U.S. PATENT DOCUMENTS

| | | | | |
|---|---|---|---|---|
| 2,979,958 | * | 4/1961 | Kennedy | 73/483 |
| 3,864,980 | * | 2/1975 | Barnes | 73/484 |
| 4,193,305 | * | 3/1980 | Hunter | 73/462 |
| 4,302,966 | * | 12/1981 | Ohnishi et al. | 73/459 |
| 4,338,818 | * | 7/1982 | Hill et al. | 73/462 |
| 4,450,529 | * | 5/1984 | Hill et al. | 73/462 |
| 4,494,400 | * | 1/1985 | Hill | 73/462 |
| 4,655,080 | * | 4/1987 | Ongaro | 73/462 |
| 4,817,429 | | 4/1989 | Goebel . | |
| 5,103,595 | * | 4/1992 | Dale et al. | 73/460 |
| 5,237,505 | * | 8/1993 | Beebe | 73/462 |
| 5,303,463 | * | 4/1994 | Pollard | 73/462 |
| 5,542,294 | * | 8/1996 | Douglas | 73/462 |
| 5,591,909 | * | 1/1997 | Rothamel et al. | 73/462 |
| 6,019,150 | * | 2/2000 | Yamagiwa | 152/506 |

FOREIGN PATENT DOCUMENTS

| | | | |
|---|---|---|---|
| 55-102709 | 8/1980 | (JP) | B60C/25/100 |
| 1-314935 | 12/1989 | (JP) | G01M/17/02 |
| 97/28431 | 8/1997 | (WO) . | |

\* cited by examiner

*Primary Examiner*—P. W. Echols
*Assistant Examiner*—Marc Jimenez
(74) *Attorney, Agent, or Firm*—Sughrue, Mion, Zinn, Macpeak & Seas, PLLC (57) ABSTRACT

An unbalance mass at the front side of a single wheel unit, an unbalance mass at the reverse side of the single wheel unit, a phase difference between the unbalance mass at the front side and the unbalance mass at the reverse side of the single wheel unit, a primary component amplitude of radial run-out of the single wheel unit, a phase angle of the primary component of the radial run-out of the single wheel unit, a contribution coefficient in which the radial run-out of the single wheel unit is transmitted to an RFV, an unbalance mass at the front side of a single tire unit, an unbalance mass at the reverse side of the single tire unit, a phase difference between the unbalance mass at the front side and the unbalance mass at the reverse side of the single tire unit, an RFV primary component amplitude of the single tire unit, and a phase angle of the RFV primary component of the single tire unit are measured and the measured values are input. Evaluation functions for evaluating an optimum assembling angle of the tire and the wheel in accordance with an object are determined, and the optimum assembling angle is determined and output as a predicted angle using the determined evaluation functions.

2 Claims, 5 Drawing Sheets

METHOD OF ASSEMBLING TIRE AND WHEEL RECORDING MEDIUM WHICH RECORDS PHASE ANGLE OPERATING PROGRAM AT THE TIME OF ASSEMBLING TIRE AND WHEEL, AND ASSEMBLY TIRE AND WHEEL UNIT

BACKGROUND OF THE INVENTION

1. Field of the Invention

The present invention relates to a method of assembling a tire and a wheel, a recording medium which records a phase angle operating program at the time of assembling a tire and a wheel, and an assembled tire and wheel unit. More particularly, the present invention relates to method of assembling a tire and a wheel, a recording medium which records a phase angle operating program at the time of assembling a tire and a wheel for obtaining an optimum phase angle at the time of assembling the tire and the wheel as a predicted angle, and an assembled tire and wheel unit which is assembled in accordance with the method of assembling a tire and a wheel.

2. Description of the Related Art

Conventionally, in order to prevent vibrations of a vehicle caused by unevenness on the peripheries of a tire and a wheel due to the irregularities at the time of manufacturing the single wheel unit and the single tire unit, a positional relationship between the wheel and the tire during assemble is intentionally selected and the assembling is effected in the positional relationship. The typical method is called radial force variation (RFV) primary matching. In this assembling method, a bottom position of a Fourier primary component of radial direction vibrations (radial run-out, the mean of the front side/reverse side of the wheel) of a single wheel unit and a peak position of an RFV primary component of a single tire are matched. This is because the RFV primary component of the single tire unit after the assembling is expected to be reduced by the value of the RFV primary component caused by the vibrations of the single wheel unit.

In addition to RFV caused by the above-described small vibrations on the periphery of the tire or unevenness of rigidity, unevenness on the periphery of the tire is also caused by unevenness of mass distribution which is called unbalance. This unbalance generates centrifugal force when the assembled tire and wheel unit is rotated and causes vibrations in a vehicle by exciting an axle at the primary frequency of rotation. After the wheel and the tire are assembled, this unbalance can be theoretically cancelled by adding balance weights having accurate masses one by one to each of specific places of flange portions at the front and reverse sides of the wheel, and balancing is actually routinely effected by a method (two-surface balancing method) in accordance with this principle using a commercially-available wheel balancer.

In an operation for correcting the unevenness of the assembled wheel and tire unit to prevent the vibrations of a vehicle, basically, the two aforementioned procedures are effected in succession and the adjustment is completed when these procedures are completed. Namely, the wheel and the tire which have been adjusted are lightened by an amount corresponding to the run-out of the wheel due to the RFV primary matching of the single tire.

However, deviation (unbalance) in the entire mass distribution which is determined after the assembling may be generated on the assembled unit by the RFV primary matching, therefore a balance weight which matches the entire amount of the deviation to be rectified is forcibly added to the assembled body from an exterior.

In this way, in accordance with the RFV primary matching, the RFV of the tire is reduced using the radial direction vibrations of the wheel which is one type of unevenness of the wheel, and the wheel and the tire are thereby assembled. The unbalance accompanying the assembling method is corrected by adding the balance weight, and the assembled tire and wheel unit is obtained.

However, the amount of balance weight required for correcting the unbalance is determined by the amounts of unbalance of the wheel and the tire and the positional relationship therebetween. As a result, in the uniform assembling of the wheel and the tire called the RVF primary matching, the effect of reducing RFV is small and the amount of balance weight is excessively large. In extreme cases, when the position of a wheel, whose vibrations are very small but which has a reasonable amount of unbalance, coincidentally matches perfectly the unbalance position of the tire at the time of effecting the assembling by the RFV primary matching, the absurd outcome is that the assembling method, in which the effect of reducing RFV is almost zero and the unbalance is the worst, ends up being intentionally selected.

Further, the excessively large balance weight is not preferable because of its appearance and is counter-productive to reducing the weight of the tire. Moreover, lead has been mainly used for the balance weight, however, since the use of lead is banned for social reasons such as environmental problems or the like, iron is considered as the alternative balance weight. Nevertheless, since the specific gravity of iron is smaller than that of lead, the volume per weight thereof increases. Thus, it is desirable that the amount of unbalance itself is reduced.

SUMMARY OF THE INVENTION

With the aforementioned in view, an object of the present invention is to obtain a method of assembling a tire and a wheel which can reduce the amount of unbalance, a recording medium which records a phase angle operating program at the time of assembling the tire and the wheel, and an assembled tire and wheel unit.

In order to achieve the above-described object, a first aspect of the present invention is a method of assembling a tire and a wheel, comprising the steps of: on the basis of a physical amount of unbalance which includes the magnitude and the position of the amount of unbalance of a tire and the magnitude and the position of the amount of unbalance of a wheel for assembling with the tire, obtaining a predicted angle for assembling the tire and the wheel using a predetermined evaluation function for evaluating the relationship between the tire and the wheel at the time of assembly; and assembling the tire and the wheel at the predicted angle.

A second aspect of the present invention is a method of assembling a tire and a wheel, comprising the steps of: on the basis of a physical amount of unbalance which includes the magnitude of the amount of unbalance on the axial direction end surfaces of a tire, the position of the amount of unbalance on the periphery of the end surface of the tire, the magnitude of the amount of unbalance on the axial direction end surfaces of a wheel for assembling with the tire, and position of the amount of unbalance on the periphery of the end surface of the wheel, obtaining a predicted angle for assembling the tire and the wheel using a predetermined evaluation function which includes the phase angle at the time of assembling the tire and the wheel for evaluating the relationship between the tire and the wheel at the time of assembly; and assembling the tire and the wheel at the predicted angle.

A third aspect of the present invention is a method of assembling a tire and a wheel according to the first aspect or the second aspect of the present invention, wherein the evaluation function indicates the magnitude of the amount of static unbalance correction after the tire and the wheel are assembled.

A fourth aspect of the present invention is a method of assembling a tire and a wheel according to the second aspect of the present invention, wherein the evaluation function indicates the magnitude of at least one of the amounts of unbalance correction on the axial direction end surfaces of the wheel after the tire and the wheel are assembled.

A fifth aspect of the present invention is a method of assembling a tire and a wheel according to the second aspect of the present invention, wherein the physical amount of unbalance further includes a physical amount relating to radial direction vibrations of the tire and a physical amount relating to radial direction vibrations of the wheel, and the evaluation function indicates the physical amounts relating to the radial direction vibrations of the tire and the wheel after the tire and the wheel are assembled.

A sixth aspect of the present invention is a method of assembling a tire and a wheel according to the second aspect of the present invention, wherein the physical amount of unbalance further includes a physical amount relating to radial direction vibrations of the tire and a physical amount relating to radial direction vibrations of the wheel, and the evaluation function indicates the sum of the physical amount of the magnitude of at least one of the amounts of unbalance correction on the axial direction end surfaces of the wheel after the wheel and the tire are assembled and a weight is attached thereto, and the physical amount relating to the radial direction vibrations of the wheel and the tire after the tire and the wheel are assembled and a weight is attached thereto.

A seventh aspect of the present invention is a method of assembling a tire and a wheel according to the second aspect of the present invention, wherein the physical amount of unbalance further includes a physical amount relating to radial direction vibrations of the tire and a physical amount relating to radial direction vibrations of the wheel, and the evaluation function indicates, in a predetermined relationship, the physical amount of the magnitude of at least one of the amounts of unbalance correction on the axial direction end surfaces of the wheel after the wheel and the tire are assembled and a weight is attached thereto, and the physical amount relating to the radial direction vibrations of the wheel and the tire after the wheel and the tire are assembled and a weight is attached thereto.

An eighth aspect of the present invention is a method of assembling a tire and a wheel according to any one of the first through seventh aspects of the present invention, wherein a valve for intaking air is attached to the wheel.

A ninth aspect of the present invention is a method of assembling a tire and a wheel according to any one of the first through eighth aspects of the present invention, wherein the physical amount relating to radial direction vibrations of the wheel is radial run-out, and the physical amount relating to radial direction vibrations of the tire is at least one uniformity of radial force variation and lateral force variation.

A tenth aspect of the present invention is a record medium which records a phase angle operating program at the time of assembling a tire and a wheel in which an optimum phase angle at the time of assembling the tire and the wheel is obtained by a computer as a predicted angle, wherein: a physical amount of unbalance which includes the magnitude of the amount of unbalance on the axial direction end surfaces of a tire, the position of the amount of unbalance on the periphery of the end surface of the tire, the magnitude of the amount of unbalance on the axial direction end surfaces of a wheel for assembling with the tire, and the position of the amount of unbalance on the periphery of the end surface of the wheel is measured; and a predicted angle for assembling the tire and the wheel is obtained on the basis of the physical amount of unbalance using a predetermined evaluation function which includes a phase angle at the time of assembling the tire and the wheel for evaluating a relationship between the tire and the wheel at the time of assembly.

An eleventh aspect of the present invention is an assembling body of a tire and a wheel, wherein: a physical amount of unbalance which includes the magnitude of the amount of unbalance on the axial direction end surfaces of a tire, the position of the amount of unbalance on the periphery of the end surface of the tire, the magnitude of the amount of unbalance on the axial direction end surfaces of a wheel for assembling with the tire, and the position of the amount of unbalance on the periphery of the end surface of the wheel is measured; a predicted angle for assembling the tire and the wheel is obtained on the basis of the physical amount of unbalance using a predetermined evaluation function which includes a phase angle at the time of assembling the tire and the wheel for evaluating the relationship between the tire and the wheel at the time of assembly; and the tire and the wheel are assembled at the predicted angle.

In the first and second aspects of the present invention, on the basis of the physical amount of unbalance which includes the magnitude and the position of the amount of unbalance of the tire and the magnitude and the position of the amount of unbalance of the wheel for assembling with the tire, the predicted angle for assembling the tire and the wheel is obtained using the predetermined evaluation function for evaluating the relationship between the tire and the wheel at the time of assembly. The tire and the wheel are assembled at this predicted angle.

The magnitudes and the positions of the amounts of unbalance of the tire and the wheel, which comprises the physical amount of unbalance, can be obtained by measuring or can be obtained using values which have been already measured. This physical amount of unbalance includes, for example, the magnitude and the phase (position) of a static unbalance, and the evaluation function can use the static unbalance after the tire and the wheel are assembled. Normally, it is desirable that the static unbalance is made small. When the single tire unit and the single wheel unit are assembled so that each phase (position) of the static unbalance thereof is 180 degrees, it can be expected that the amount of static unbalance after the tire and the wheel are assembled will be reduced. Accordingly, the amount of unbalance to be corrected can be made as small as possible at the time of assembling the wheel and the tire, and the magnitude of the balance weight which should be the magnitude of the amount of unbalance to be corrected after the wheel and the tire are assembled can be reduced. Consequently, even if iron whose specific gravity is smaller than that of lead which has been conventionally used is used, the amount of unbalance itself can be reduced. Thus, correction of unbalance can be effected without increasing the volume of the iron used.

Therefore, in accordance with the third aspect of the present invention, when an evaluation function which indicates the magnitude of the amount of static unbalance correction after the tire and the wheel are assembled is used, and the tire and the wheel are assembled at the predicted angle of, for example, 180 degrees which can optimize the amount of unbalance to be corrected, the balance weight for correcting the unbalance can be made small.

The phase (position) can be set to 180 degrees, the value which is in the vicinity of 180 degrees, or a predetermined range. The evaluation function may be determined so that the amount of static unbalance after the assembling is a predetermined value.

The physical amount of unbalance can include the magnitude of the amount of unbalance on the axial direction end surfaces of the tire, the position of the amount of unbalance on the periphery of the end surface of the tire, the magnitude of amount of unbalance on the axial direction end surfaces of the wheel for assembling with the tire and the position of the amount of unbalance on the periphery of the end surface of the wheel.

On the basis of these physical amounts of unbalance, the predicted angle for assembling the tire and the wheel is obtained using the predetermined evaluation function which includes the phase angle at the time of assembling the tire and the wheel for evaluating the relationship between the tire and the wheel at the time of assembly. In this case, the deviated angle at the time in which the predetermined reference positions on the peripheries of the tire and the wheel are deviated from each other and assembled is the phase angle at the time of assembling the tire and the wheel, and the phase angle is used as a parameter. The relationship between the tire and the wheel at the time of assembly is evaluated and, for example, the magnitude or the like of the amount of unbalance to be corrected at the phase angle is obtained. The phase angle at the time of assembling the wheel and the tire which can optimize this evaluation function is predicted and the predicted phase angle is made the predicted angle. Then, the tire and the wheel are assembled by the obtained predicted angle.

In this way, since the tire and the wheel are assembled at the predicted angle which can optimize the evaluation function, the amount of unbalance to be corrected can be made as small as possible at the time of assembling the tire and the wheel, and the magnitude of a balance weight which should be the magnitude of the amount of unbalance to be corrected after the wheel and the tire are assembled can be reduced. Consequently, even if iron whose specific gravity is smaller than that of lead, which has been conventionally used, is used, the amount of unbalance to be corrected itself can be reduced. Thus, correction of unbalance can be effected without increasing the volume of the iron used.

Even when the amount of unbalance on the axial direction end surfaces of the tire and the amount of unbalance on the axial direction end surfaces of the wheel are used as the physical amount of unbalance, in accordance with the third aspect of the present invention, the evaluation function which indicates the magnitude of the amount of static unbalance to be corrected after the tire and the wheel are assembled can be used. In this way, when the tire and the wheel are assembled so that the phase formed by the amount of unbalance on the axial direction end surfaces of the wheel and the phase formed by the amount of unbalance on the axial direction end surfaces of the tire is, for example, 180 degrees which can optimize the amount of unbalance to be corrected, the balance weight for correcting the unbalance can be made small.

In accordance with the fourth aspect of the present invention, the evaluation function which indicates the magnitude of at least one of the amounts of unbalance to be corrected on the axial direction end surfaces of the wheel after the tire and the wheel are assembled can be used. The magnitude of the amount of unbalance to be corrected at the phase angle is obtained by this evaluation function. When the phase angle at the time of assembling the wheel and the tire which allows the amount of unbalance to be corrected to be optimized (e.g., which allows the magnitude of the balance weight to be reduced, which allows the magnitude of the balance weight to be set to a predetermined value, or which allows the magnitude of the balance weight to be set to a value within a predetermined range) is set as a predicted angle and the tire and the wheel are assembled at the predicted angle, the amount of unbalance to be corrected is reduced and the balance weight for correcting the unbalance can be made small.

In accordance with the fifth aspect of the present invention, the physical amount of unbalance can further include the physical amount relating to the radial direction vibrations of the tire and the physical amount relating to the radial direction vibrations of the wheel. In this case, the evaluation function which indicates the physical amounts relating to the radial direction vibrations of the tire and the wheel after the tire and the wheel are assembled can be used. As a result, the phase angle which can optimize the amount of unbalance to be corrected, e.g., which can reduce the RFV primary component or the like after the wheel and the tire are assembled, can be obtained as the predicted angle. When the tire and the wheel are assembled at the predicted angle, the amount of unbalance to be corrected, e.g., the magnitude of the balance weight or the RFV primary component, can be made as small as possible, can be set to a predetermined value, or can be set to a value within a predetermined range. Thus, it is easy to assemble the wheel and the tire.

In accordance with the sixth aspect of the present invention, an evaluation function can be used which indicates the sum of the physical amount of the magnitude of at least one of the amounts of unbalance correction on the axial direction end surfaces of the wheel after the wheel and the tire are assembled and a weight is attached thereto, and the physical amount relating to the radial direction vibrations of the wheel and the tire after the tire and the wheel are assembled and a weight is attached thereto. Since the physical amounts are weighted in this way, the relationship between the tire and the wheel at the time of assembly can be evaluated by the linear sum of the amounts of unbalance. As a result, the amount of unbalance to be corrected, e.g., the magnitude of the balance weight, the RFV primary component, or the like, can be made as small as possible, can be set to a predetermined value, or can be set to a value within the predetermined range. Thus, the optimum phase angle at the time of assembling the tire and the wheel can be obtained.

Further, in accordance with the seventh aspect of the present invention, the weighted physical amounts of the evaluation function may have a predetermined relationship. In this way, the relationship is not limited to the evaluation by a linear sum and may be evaluated, e.g., by a non-linear function or the like. Moreover, a table which includes predetermined corresponding relationships on the physical amounts may be referred to and the physical amounts summed or calculated by a predetermined function to obtain the predetermined relationship. As a result, it is more flexible to, for example, reduce greatly the amount of unbalance to be corrected, e.g., the magnitude of the unbalance weight or the RFV primary component.

The air intake valve is attached to the wheel, and the weight of this air intake valve may contribute to the unbalance. Thus, in accordance with the eighth aspect of the present invention, the wheel, to which the valve for intaking air is attached, is used. As a result, the optimum phase angle for assembling the tire and the wheel, to which the actual air intake valve is attached, can be obtained.

In accordance with the ninth aspect of the present invention, the physical amount relating to the radial direction vibrations of the wheel can use the radial run-out, and the physical amount relating to the radial direction vibrations of the tire can use at least one uniformity of the radial force variation and the lateral force variation.

The predicted angle which is an optimum phase angle for assembling the tire and the wheel is obtained by a record medium which stores a phase angle operating program having the following procedures. The storage medium which stores the program is easily portable allowing the program to be used on-site when the tires and wheels are being assembled.

Namely, the recording medium which records the phase angle operating program of the tenth aspect of the present invention is the record medium which records the phase angle operating program at the time of assembling the tire and the wheel in which the optimum phase angle at the time of assembling the tire and the wheel is obtained by the computer as the predicted angle, wherein: the physical amount of unbalance which includes the magnitude of an amount of unbalance on the axial direction end surfaces of the tire, the position of an amount of unbalance on the periphery of the end surface of the tire, the magnitude of an amount of unbalance on the axial direction end surfaces of the wheel for assembling with the tire, and the position of an amount of unbalance on the periphery of the end surface of the wheel is measured; and the predicted angle for assembling the tire and the wheel is obtained on the basis of the physical amount of unbalance using the predetermined evaluation function which includes the phase angle at the time of assembling the tire and the wheel for evaluating the relationship between the tire and the wheel.

In accordance with the method of assembling the tire and the wheel in which the predicted angle of the tire and the wheel is obtained and the tire and the wheel are assembled at the predicted angle, the following assembled tire and wheel unit can be obtained. Namely, in accordance with the eleventh aspect of the present invention, the assembled tire and wheel unit, wherein: the physical amount of unbalance which includes the magnitude of an amount of unbalance on the axial direction end surfaces of the tire, the position of an amount of unbalance on the periphery of the end surface of the tire, the magnitude of an amount of unbalance on the axial direction end surfaces of the wheel for assembling with the tire, and the position of an amount of unbalance on the periphery of the end surface of the wheel is measured; the predicted angle for assembling the tire and the wheel is obtained on the basis of the physical amount of unbalance using the predetermined evaluation function which includes the phase angle at the time of assembling the tire and the wheel for evaluating the relationship between the tire and the wheel; and the tire and the wheel are assembled at the predicted angle.

DESCRIPTION OF THE PREFERRED EMBODIMENTS

An embodiment of the present invention will be explained in detail hereinafter with reference to the drawings.

First, the principle of the present invention will be explained.

The unbalances of a single wheel unit, a single tire unit, and an assembled tire and wheel unit will be described with reference to FIGS. 1 through 3.

Figure 1:
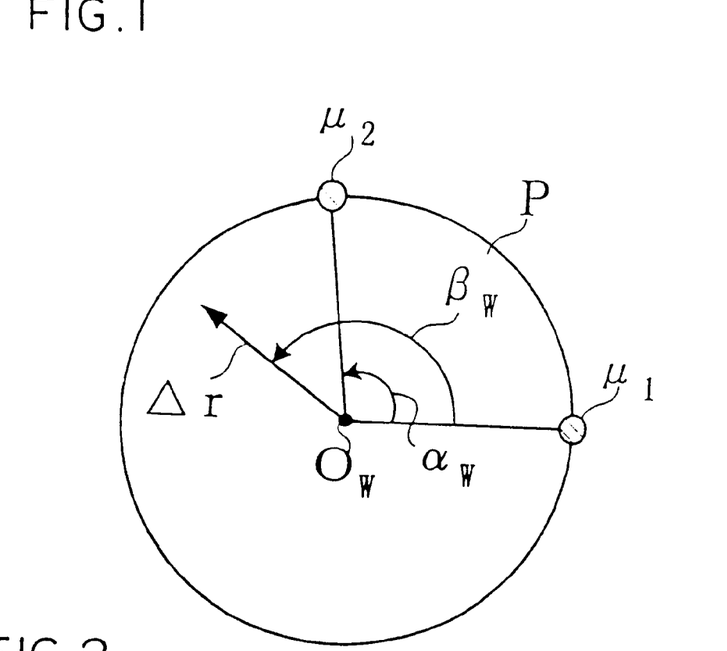
FIG. 1 is a principle explanatory diagram for explaining the principle of the present invention pertaining to a wheel.

As shown in FIG. 1, a wheel surface P is a surface (so-called equatorial plane) which is parallel to end surfaces (front and reverse surfaces) of a wheel for assembling with a tire and passes through a center $O_w$. Further, as a result of measurement using an unbalance measuring machine which is used normally and widely for correcting unbalances simultaneously, it is assumed that an unbalance mass $\mu_1$, which is a vector amount, is needed on the circumference of the front surface of the wheel (on the periphery of the end surface of the wheel), that an unbalance mass $\mu_2$, which is a vector amount, is needed on the circumference of the reverse surface of the wheel, and that the unbalance masses $\mu_1$ and $\mu_2$ have a phase difference $\alpha_w$. These unbalance masses $\mu_1$ and $\mu_2$ are projected on the wheel surface P and will be explained hereinafter. Further, it is assumed that a radial run-out primary component Δr measured at the single wheel is disposed on the position of a phase angle $\beta_w$ on the basis of the position of the unbalance mass $\mu_1$.

Figure 2:
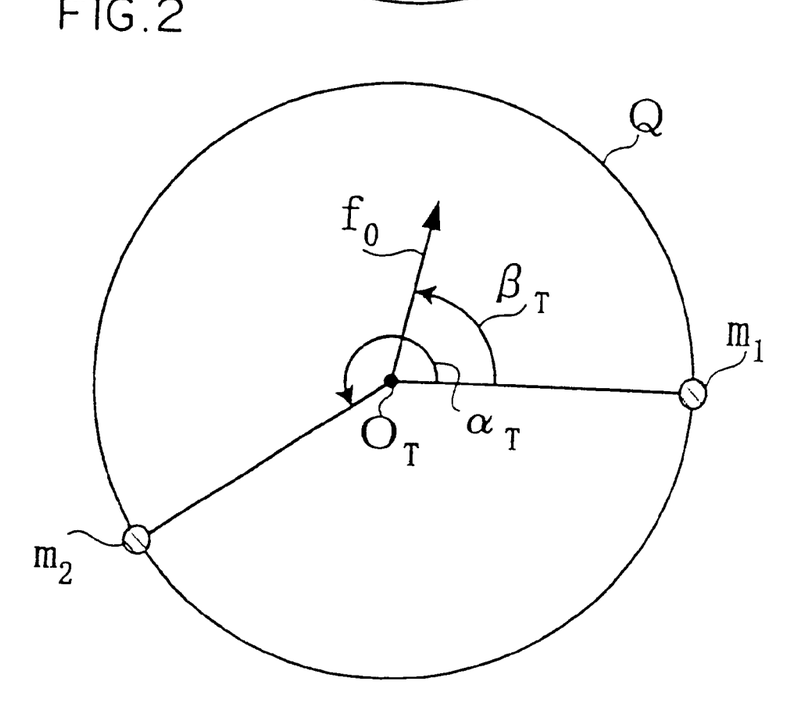
FIG. 2 is a principle explanatory diagram for explaining the principle of the present invention pertaining to a tire.

As shown in FIG. 2, a tire surface Q is a surface (so-called equatorial plane) which is parallel to end surfaces (front and reverse surfaces) of a tire and passes through a center $O_T$. Further, as a result of measurement using the unbalance measuring machine which is the same as the one described above, it is assumed that an unbalance mass $m_1$, which is a vector amount, is needed on the circumference of the front surface of the tire (on the periphery of the end surface of the wheel), that an unbalance mass $m_2$, which is a vector amount, is needed on the circumference of the reverse surface of the tire, and that the unbalance masses $m_1$ and $m_2$ have a phase difference $\alpha_T$. These unbalance masses $m_1$ and $m_2$ are projected on the tire surface Q and will be explained hereinafter. Further, it is assumed that an RFV primary component amplitude $f_0$ measured at the single tire is disposed on the position of a phase angle $\beta_T$ on the basis of the position of the unbalance mass $m_1$.

Figure 3:
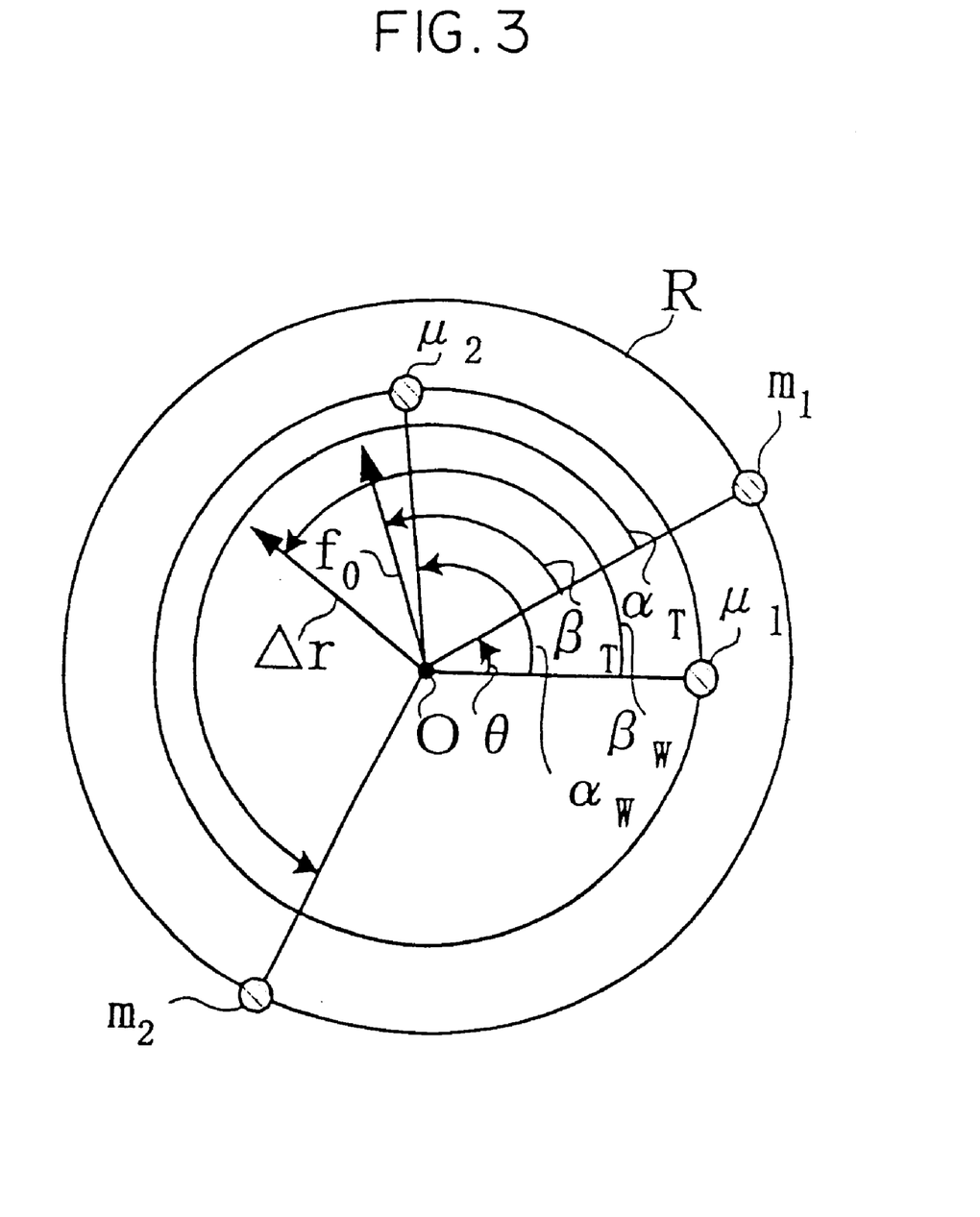
FIG. 3 is a principle explanatory diagram for explaining the principle of the present invention pertaining to an assembled tire and wheel unit.

As shown in FIG. 3, an assembled unit surface R is a surface (so-called equatorial plane) which is parallel to the end surfaces (front and reverse surfaces) of the assembled unit, in which the single wheel unit and the single tire unit which are defined as described above are assembled, and passes through a center O. Further, the wheel in FIG. 1 and the tire in FIG. 2 are assembled having an arbitrary assembling angle (phase angle) $\theta$. This assembling angle $\theta$ is a counterclockwise assembling angle of the unbalance mass $m_1$ of the tire on the basis of the position of the unbalance mass $\mu_1$ of the wheel.

Because the measured values of unbalances (two-surface balances) of the single wheel unit and the single tire unit and the measured values of the radial run-out primary component of the single wheel and the RFV primary component of the single tire are obtained, the amounts of unbalance and the RFV primary component at the time of assembling the wheel and tire in the arbitrary positional relationship (the assembling angle $\theta$ in FIG. 3) can be predicted as a function of the assembling angle $\theta$. Namely, as described below, the amounts of unbalance and the RFV primary component can be predicted in formulas formed by vector compositions of forces corresponding to the above-described factors.

The amount of unbalance weight to be corrected $n_1$ at the front side of the assembled wheel can be expressed by the following formula (1).

$$n_1 = \sqrt{\mu_1^2 + m_1^2 + 2\mu_1 m_1 \cos\theta} \qquad (1)$$

The amount of unbalance weight to be corrected $n_2$ at the reverse side of the assembled wheel can be expressed by the following formula (2).

$$n_2 = \sqrt{\mu_2^2 + m_2^2 + 2\mu_2 m_2 \cos(\theta + \alpha_T - \alpha_w)} \qquad (2)$$

The amplitude f of the RFV primary component can be expressed by the following formula (3).

$$f = \sqrt{f_0^2 + (k\Delta r)^2 + 2 f_0 (k\Delta r) \cos(\theta + \beta_T - \beta_w)} \qquad (3)$$

wherein, $\mu_1$ is an unbalance mass at the front side of the single wheel unit;

$\mu_2$ is an unbalance mass at the reverse side of the single wheel unit;

$\alpha_w$ is a phase difference between $\mu_1$ and $\mu_2$ (a counterclockwise angle from the position of $\mu_1$ to the position of $\mu_2$ when viewed from the front side);

$m_1$ is an unbalance mass at the front side of the single tire unit;

$m_2$ is an unbalance mass at the reverse side of the single tire unit;

$\alpha_T$ is a phase difference between $m_1$ and $m_2$ (a counterclockwise angle from the position of $m_1$ to the position of $m_2$ when viewed from the front side);

$\theta$ is a counterclockwise assembling angle from the position of $\mu_1$ of the wheel to the position of $m_1$ of the tire;

$\Delta r$ is a primary component amplitude of a radial run-out (front and reverse average waveform) of the single wheel unit;

k is a contribution coefficient in which the radial run-out of the single wheel unit is transmitted to the RFV;

$\beta_w$ is a phase angle of $\Delta r$ which is measured counterclockwisely from the position of $\mu_1$;

$f_0$ is an RFV primary component amplitude of the single tire unit; and $\beta_T$ is a phase angle of $f_0$ which is measured counterclockwisely from the position of $m_1$.

Among the above-described parameters, only the contribution coefficient k is unknown. It is considered that this contribution coefficient k is an amount determined by the rigidity of the tire itself. More specifically, the difference between the RFV primary amplitude when the assembling is effected in accordance with the RFV primary matching and the REV primary amplitude when the assembling is effected by shifting 180 degrees therefrom is halved and divided by $\Delta r$. The contribution coefficient k is thereby obtained. Since it is considered that this contribution coefficient k is a constant which is the same among tires having the same specifications, if the contribution coefficient k of one representative tire or tires having the same specifications is obtained in accordance with the above-described measurement, it is no longer necessary thereafter to measure the contribution coefficients k of respective tires and the obtained value can be used for prediction in the above formulas (1), (2), and (3).

Next, the above formulas (1), (2), and (3) will be explained in detail.

First, a description regarding the states of unbalance of a wheel and a tire will be explained. As it is clear that both the static unbalance and the dynamic unbalance of the wheel or the tire can be completely corrected by a balancer on the principle of two-plane balancing, the state of unbalance is the same as the state in which an extra mass which is the same as a correction weight exists (with respect to a completely balanced state) at a position substantially 180 degrees opposite the position on the front and reverse flange portion of the wheel at which the correction balance weight is to be added. Accordingly, the state of unbalance can be described by four parameters, i.e., ① an unbalance mass at the front side, ② an angle coordinate which shows the position at which the unbalance mass at the front side exists, ③ an unbalance mass at the reverse side, ④ an angle coordinate which shows the position at which the unbalance mass at the reverse side exists. Since the origin of the angle coordinate can be arbitrarily determined, if the position at which the unbalance mass at the front side exists in parameter ② is selected to be an origin, the parameter ② can be zero. The parameters which specify the states of unbalance of the wheel and the tire in the above formulas will be respectively given as $(\mu_1, O, \mu_2, \alpha_w)$ and $(m_1, O, m_2, \alpha_T)$. These are regarded as states of unbalance.

Next, when the wheel in the state of unbalance $(\mu_1, O, \mu_2, \alpha_w)$ and the tire in the state of unbalance $(m_1, O, m_2, \alpha_T)$ are assembled so that the position of the unbalance mass $m_1$ of the tire is disposed at the position of the angle which is counterclockwise from the position of the unbalance mass $\mu_1$ of the wheel, the overall state of unbalance can be described by the similar four parameters and the state of unbalance is defined as $(n_1, \gamma_1, n_2, \gamma_2)$ (wherein, the origin of the angle matches the position of the unbalance mass $\mu_1$). A physical meaning of the state of unbalance $(\mu_1, O, \mu_2, \alpha_w)$ or the like is that, when the wheel is rotated, centrifugal force which is proportional to the unbalance mass $\mu_1$ is applied in the direction toward the position of the unbalance mass $\mu_1$ from the wheel center at the front side of the wheel and that centrifugal force which is proportional to the unbalance mass $\mu_2$ is applied in the direction of the reverse side (in the direction toward the position of the unbalance mass $\mu_2$). The same is applied to the state of unbalance ($m_1$, O, $m_2$, $\alpha_T$). When the tire and the wheel are assembled, the resultant forces (i.e., the force of $n_1$) of the unbalance mass $\mu_1$ and the unbalance mass $m_1$ are applied to the front side of the wheel and the resultant forces (i.e., the force of $n_2$) of the unbalance mass $\mu_2$ and the unbalance mass $m_2$ are applied to the reverse side of the wheel. Accordingly, from the composition rule of forces, when these components of forces are expressed in a rectangular coordinate system in which the direction of unbalance mass $\mu_1$ is X-axis and the direction 90 degrees counterclockwise from the X-axis is Y-axis, the following formulas are formed.

$$n_1 \cos \gamma_1 = \mu_1 + m_1 \cos \theta \quad (4)$$

$$n_1 \sin \gamma_1 = m_1 \sin \theta \quad (5)$$

$$n_2 \cos \gamma_2 = \mu_2 \cos \alpha_w + m_2 \cos (\theta + \alpha_T) \quad (6)$$

$$n_2 \sin \gamma_2 = \mu_2 \sin \alpha_w + m_2 \sin (\theta + \alpha_T) \quad (7)$$

The formula (1) is obtained by squaring, summing, and extracting the square root both sides of the above-described formulas (4) and (5). The formula (2) is obtained in the same way from the formulas (6) and (7).

Next, the formula (3) will be explained.

The principle of RFV primary matching is expressed in the formula (3). Namely, the RFV of the single tire unit is the one in which the tire is assembled with a wheel which has very high degree of roundness and is precisely manufactured. Because the RFV is not affected by the vibrations of the wheel, the value does not depend on the assembling angle. Consequently, since the phase is determined only by the coordinates fixed to the tire at the time of primary component amplitude $f_0$, the value of the primary component amplitude which is measured on the basis of the position of the unbalance mass $m_1$ is a phase angle $\beta_T$. On the other hand, when the wheel which has a radial run-out in which a primary component amplitude is $\Delta r$ and a phase angle is $\beta_w$ in a wheel system is assembled to the tire, it is approximately considered that an additional RFV primary component of the wheel having an amplitude which is proportional to the primary component amplitude $\Delta r$ (the proportional constant thereof is the aforementioned contribution coefficient k) and having a phase angle $\beta_w$ is vector-added to the RFV primary component of the single tire unit and that the entire RFV primary component is formed. At this time, it should be noted that the phase of the RFV primary component of the single tire unit is added only at the assembling angle $\theta$ in the wheel system. The amplitude of the RFV primary component of the entire system which is the magnitude of the result of the vector addition is given by the formula (3) in the same way as in the case of the formula (2).

As described above, if the formulas (1), (2), and (3) are used, the amount of unbalance and the RFV primary component when the wheel and the tire are assembled in the arbitrary positional relationship (the assembling angle $\theta$ in FIG. 3) can be predicted as the function of the assembling angle $\theta$.

When the tire and the wheel are assembled, a plurality of conditions are considered according to the demand of users as to how to balance the assembled tire and wheel unit. For example, the entire unbalance mass is reduced and corrected, or the RFV primary component amplitude is reduced and corrected, or these are combined and corrected, or the like. These conditions are determined as evaluation functions. Namely, the evaluation functions which match a purpose are determined and the assembling angle when the evaluation functions are optimized is obtained. In this way, the correction of unbalance which matches the purpose can be carried out.

General concrete examples of evaluation functions will be described below.

[Evaluation Functions]

(A) evaluation function=$n_1+n_2$ (B) evaluation function=$n_1$ (C) evaluation function=$A\,n_1 + B\,n_2 + C\,f$ (A, B, C>0)

(D) (if $f_0 + k\Delta r <$ RFV reference value)
    evaluation function=$n_1+n_2$ (E) (if $f_0 + k\Delta r \geq$ RFV reference value, and $\mu_1+m_1+\mu_2+m_2<$amount of weight-reference value)
    evaluation function=$f$ (F) (if $f_0 + k\Delta r \geq$ RFV reference value, and $\mu_1+m_1+\mu_2+m_2\geq$ amount of weight reference value)
    evaluation function=evaluation function (C)

(G) evaluation function=amount of static unbalance after assembling

The evaluation function (A) evaluates amounts of unbalance weight to be corrected $n_1$ and $n_2$ at the front and reverse sides of the wheel which is assembled with the assembling angle $\theta$ being a parameter. The evaluation function (B) evaluates an amount of unbalance weight to be corrected in at the front side of the wheel which is assembled with the assembling angle $\theta$ being a parameter. The evaluation function (C) evaluates amounts of unbalance weight to be corrected $n_1$ and $n_2$ and the RFV primary amplitude f at the front and reverse sides of the wheel which is assembled with the assembling angle $\theta$ being a parameter. The evaluation function (D) evaluates amounts of unbalance weight to be corrected $n_1$ and $n_2$ at the front and reverse sides of the wheel which is assembled with the assembling angle $\theta$ being a parameter and only when $f_0+k\Delta r<$RFV reference value. The evaluation function (E) evaluates an RFV primary amplitude f only when $f_0+k\Delta r \geq$ RV reference value and $\mu_1+m_1+\mu_2+m_2<$amount of weight reference value. The evaluation function (F) evaluates the same as that of the evaluation function (C) only when $f_0+k\Delta r \geq$ RFV reference value and $\mu_1+m_1+\mu_2+m_2 \geq$ amount of weight reference value. The evaluation function (G) evaluates an amount of static unbalance after the assembling with the assembling angle $\theta$ being a parameter.

In the above-described evaluation functions, when only the amount of unbalance weight to be corrected $n_1$ is minimized using the evaluation function (B), an optimum value $\theta^*$ of the assembling angle can be obtained as $\pi$.

Further, when only the amplitude f of the RFV primary component is minimized using the evaluation function (E), the conventional RFV primary matching is effected, and an optimum value $\theta^*$ of the assembling angle $\theta$ can be easily obtained by the following formula (8).

$$\theta^* = \pi - \beta_T + \beta_W \quad (8)$$

Moreover, when the amount of static unbalance after the assembling is minimized using the evaluation function (G), an optimum value $\theta^*$ can be easily obtained by the following formula (9).

$$\theta^* = \pi + \mathrm{agr}(\mu_1+\mu_2 \cos \alpha_w, \mu_2 \sin \alpha_w) - \mathrm{agr}(m_1+m_2 \cos \alpha_T, \mu_2 \sin \alpha_T) \quad (9)$$

wherein, agr (x, y) is an angle which is formed by a positional vector which links an origin point with coordinates (x, y) counterclockwise from the x-axis.

In the above-described formula (9), the unbalance mass ($\mu_1, \mu_2$, $m_1$, $m_2$) exists as a parameter. However, these vector components are acted on by the optimum value $\theta^*$, and the value of each of the amounts of unbalance (the parameters on both surfaces) is not needed. As far as the magnitudes of unbalance of the tire and the wheel, i.e., the amount of static unbalance and the phase, are known, the optimum value $\theta^*$ can be decided by the condition in which the phase of wheel's static unbalance and the phase of tire static unbalance are just 180 degrees opposite each other. Accordingly, as a simple concrete example, when only the amount of static unbalance and the phase are known, the above-described evaluation function (G) are effective. Namely, when the amounts of static unbalance of the tire and the wheel and the phase are known, the tire and the wheel are assembled so that the phase becomes π (180 degrees).

In the above-described evaluation functions (B), (E), and (G), the assembling angle θ can be easily obtained. However, in the other evaluation functions, the assembling angle θ which provides an optimum value of the evaluation function cannot be always obtained analytically. The assembling angle θ can be easily determined by numerical computation. Namely, if the necessary parameters are input using a spreadsheet program and numerical operation of a personal computer, it is easy to output a result instantly. Namely, degrees from 0 to 360 are divided into as many equivalent angles as the accuracy of the angle to be obtained requires, the evaluation function of each angle step is actually calculated, and an optimum value may be determined from the results, i.e., all of the calculated results.

Next, a description will be given of a system for obtaining a phase angle when a tire and a wheel are assembled on the basis of the aforementioned principle.

Figure 4:
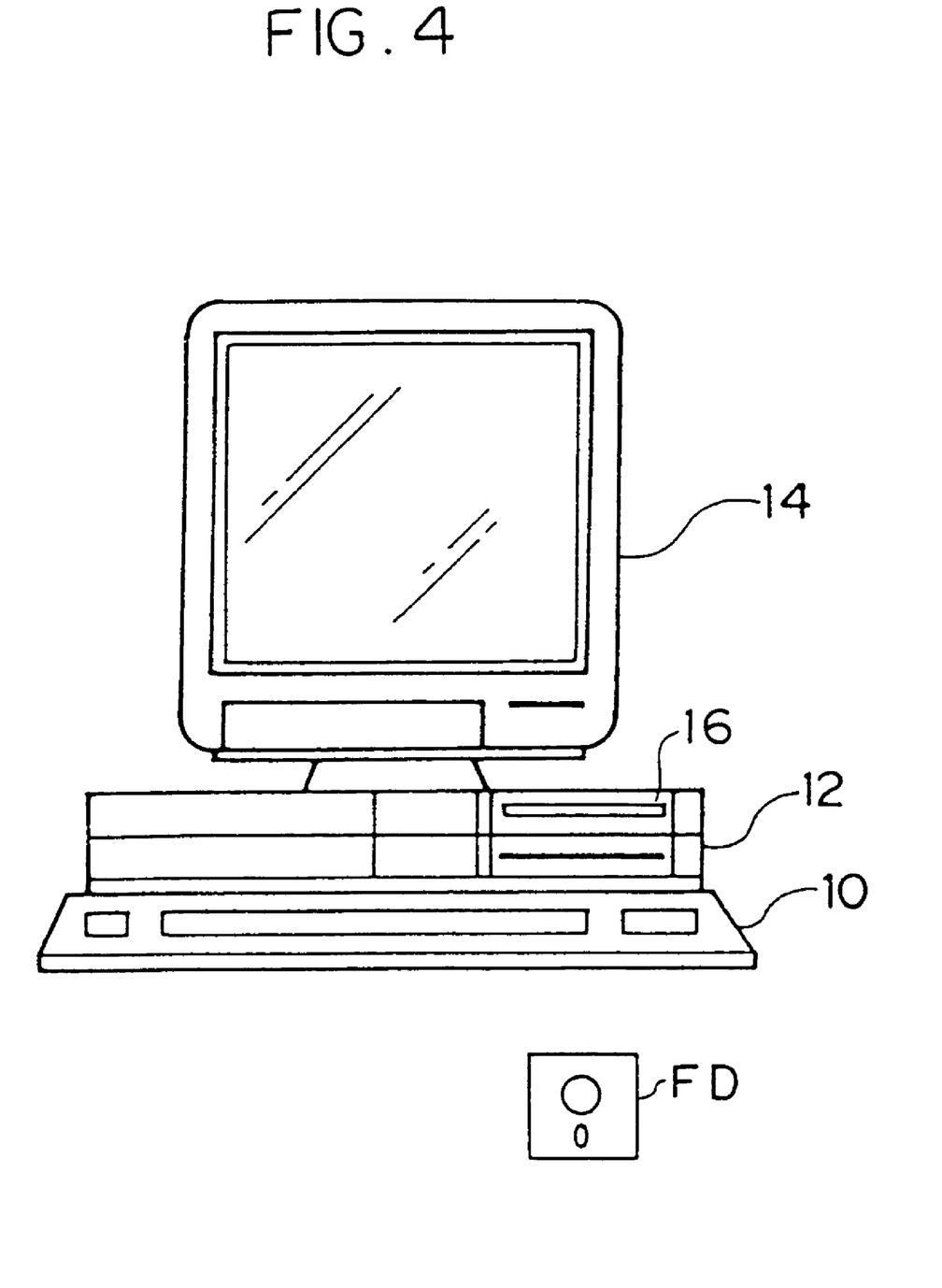
FIG. 4 is a schematic view of a personal computer which is used in an embodiment of the present invention.

FIG. 4 shows a schematic view of a personal computer for effecting a method of assembling a tire and a wheel of the present invention. The personal computer comprises a keyboard 10 for inputting data or the like, a computer main body 12 which evaluates a phase angle at the time of assembling a tire and a wheel in accordance with a program stored in advance, and a CRT 14 which displays evaluation results or the like of the computer main body 12. The computer main body 12 is formed by a microcomputer comprising an unillustrated CPU, ROM, and RAM.

The computer main body 12 includes a recording medium which records a phase angle operating program at the time of assembling a tire and a wheel of the present invention, e.g., a floppy disk unit (FDU) 16 into/from which a floppy disk(FD) can be inserted/removed. A processing routine, which will be described later, or the like can be read from and written onto the FD using the FDU 16. Consequently, the processing routine, which will be described later, may be recorded onto the FD in advance without being recorded onto the unillustrated ROM in the computer main body 12 and execute a processing program recorded onto the FD via the FDU 16. A mass storage system (unillustrated) such as a hard disk device or the like may be connected to the computer main body 12 and the processing program recorded onto the FD may be installed in the mass storage system (unillustrated) and executed. Further, an optical disk such as a CD-ROM or the like and an optical magnetic disk such as an MD, MO, or the like exist as a the recording medium, and when these disks are used, a CD-ROM device, an MD device, an MO device, or the like may be used instead of the above-described FDU 16.

Next, a description will be given of a processing for obtaining a predicted angle which is an optimum angle among phase angles at the time of assembling a tire and a wheel.

As explained in the above principle, the present inventors have considered that the correction of unbalance to fulfil a purpose can be evaluated to be effected on the assembling of a tire and a wheel by predicting the amount of unbalance and the RFV primary component when the wheel and the tire are assembled in an arbitrary positional relationship (the assembling angle θ in FIG. 3) using the formulas (1) through (3) as a function of the assembling angle θ.

Figure 5:
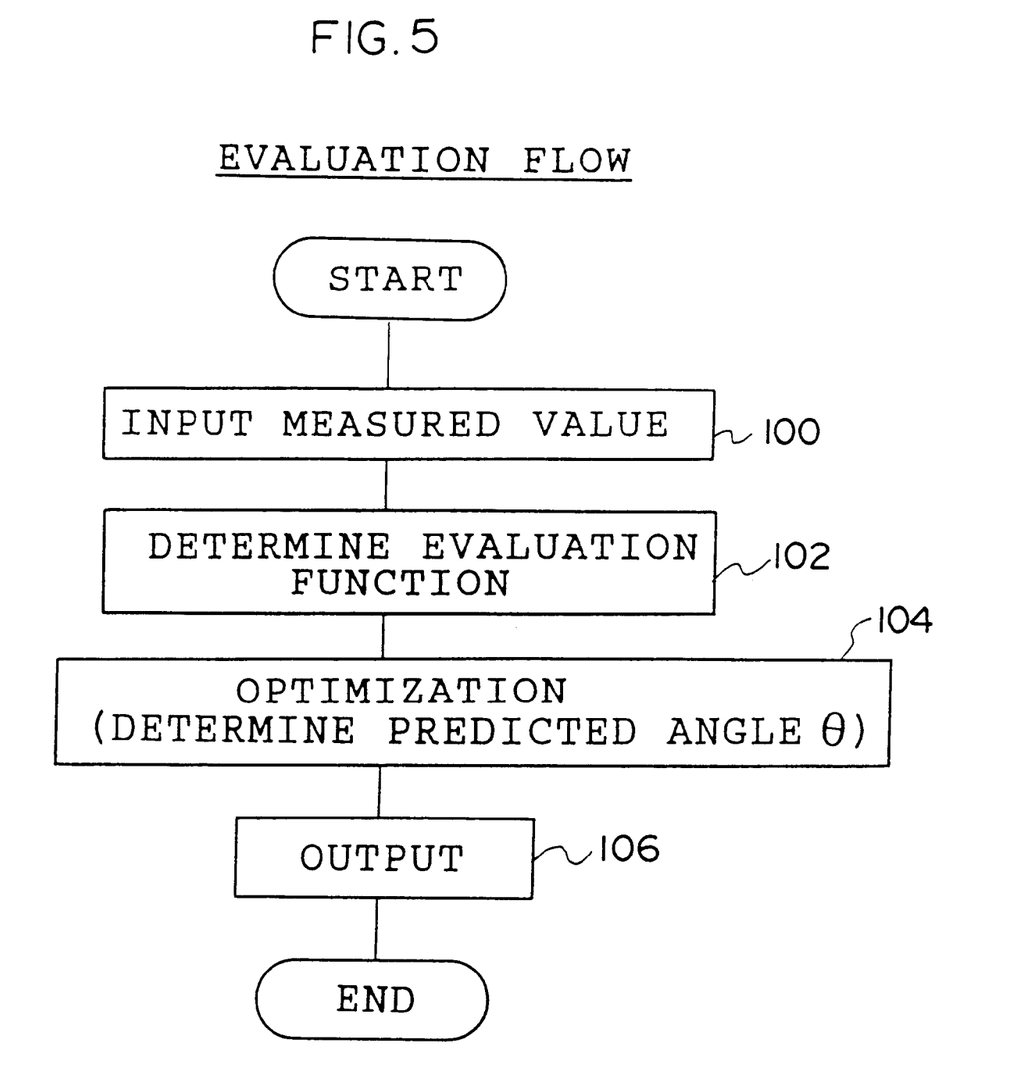
FIG. 5 is a flow chart showing a processing routine of the embodiment of the present invention.

FIG. 5 shows a processing routine of a program of the present embodiment. In step 100, measured values are input. These measured values are an unbalance mass $\mu_1$ at the front side of a single wheel unit, an unbalance mass $\mu_2$ at the reverse side of the single wheel unit, a phase difference $\alpha_w$, a primary component amplitude Δr of a radial run-out of the single wheel unit, a phase angle $\beta_w$, a contribution coefficient k, an unbalance mass $m_1$ at the front side of the single tire unit, an unbalance mass $m_2$ at the reverse side of the single tire unit, a phase difference $\alpha_T$, an RFV primary component amplitude of of the single tire unit, and a phase angle $\beta_T$.

In a subsequent step 102, evaluation functions which are explained above are determined. In the next step 104, an optimum assembling angle is determined as a predicted angle θ using the determined evaluation function and is output in the next step 106.

By effecting the assembling of the wheel and the tire at the assembling angle θ which is determined by various types of evaluation functions as described above, the present inventors have studied in simulation the assembled unit to be actually obtained.

First, a population model relating to dispersions of products of the wheel and the tire is assumed. In a condition to be expressed, the wheel has the three random vectors ($\mu_1, \mu_2$, kΔr), where $\mu_1$ is the unbalance mass at the front side, $\mu_2$ is the unbalance mass at the reverse side, and Δr is the primary component amplitude of dradial run-out. The tire has the three random vectors ($m_1, m_2, f_0$), where $m_1$ is the unbalance mass at the front side, $m_2$ is the unbalance mass at the reverse side, and $f_0$ is the RFV primary component amplitude. These probability distributions are considered as follows for modeling.

First, when the starting point of the respective random vector distributions is placed on the origin point, the end point follows such distribution in which the X coordinate and the Y coordinate follow independently the same normal distribution (standard deviation σ) on the X-Y plane. By doing so, a probability distribution is formed in which the directions of vectors have the same probabilities in every direction and only the length exists. However, the distribution of length is known as a Rayleigh distribution, and the mean is $\{\sqrt{(\pi/2)}\,\sigma\}$ and a mean square value is $2\sigma^2$. Thus, a standard random vector in which $2\sigma^2=1$ is assumed for vector e. When E () is defined as the symbol of an expectation, the expectation of vector e can be expressed in the following formula (10).

$$E(e)=0$$

$$E(|e|)=\sqrt{\pi}/2$$

$$E(ee)=1 \qquad (10)$$

Accordingly, a random vector A in which the mean of a length is α can be expressed in the following formula (11).

$$A=(2/\sqrt{\pi})\alpha e \qquad (11)$$

Next, vector B which correlates to the vector A is considered. When β is the mean of a length, it can be expressed as $B=(2/\sqrt{\pi})\beta$ e' (wherein, vector e' is a separate standard random vector which is not independent from the vector e). A correlation coefficient $\rho$ of the two random vectors A and B is defined in the following formula (12).

$$\rho = E(AB)/[\sqrt{E(A^2)}\sqrt{E(B^2)}] \quad (12)$$

When the vectors A and B are definite vectors, since the correlation coefficient $\rho$ is equal to the cosine of the angle formed by these directions, nearness between the directions of vectors is indicated. In this case, when the correlation coefficient $\rho$ is expressed by the standard vector, the following formula (13) is formed.

$$\rho = E(ee') \quad (13)$$

Here, e'=$\rho$e+ce" (wherein, vector e" is another standard random vector which is independent from the vector e). When both sides of this definition formula are multiplied by the vector e and an expectation is obtained by using the result, the definition formula corresponds to the formula (13) in which the correlation coefficient of the vector e and the vector e' is $\rho$. Further, because the expectation which is obtained by squaring both sides must be equal to 1, the value of c is determined as $\sqrt{(1-\rho^2)}$. Next, a third vector C which correlates with the vectors A and B by correlation coefficients $\rho'$ and $\rho''$ is considered. In the same consideration as described above, when the third independent standard vector is introduced into the vector C, the vector C can be expressed by the linear combination of three standard vectors and the coefficients can be expressed as $\rho$, $\rho'$, and $\rho''$. Namely, models of random vectors A, B, C which correlate to each other can be expressed in the following formula (14).

$$A = \sqrt{E(A^2)}e_1$$

$$B = \sqrt{E(B^2)}[\rho e_1 + \sqrt{1-\rho^2}e_2]$$

$$C = \sqrt{E(C^2)}\left[\rho' e_1 + \frac{\rho'' - \rho\rho'}{\sqrt{1-\rho^2}}e_2 + \left(\sqrt{1-\rho'^2 - \frac{(\rho''-\rho\rho')^2}{1-\rho^2}}\right)e_3\right] \quad (14)$$

wherein, $e_1$, $e_2$, and $e_3$ are standard random vectors which are independent from each other. More specifically, in order to generate the vectors $e_1$, $e_2$, and $e_3$, the x component and the y component may be independent normal distribution random numbers whose standard deviation is $(1/\sqrt{2})$.

Models of the above-described random vectors are applied to the vectors $\mu_1$, $\mu_2$, $k\Delta r$ and the vectors $m_1$, $m_2$, and $f_0$. An example which studies optimization of various evaluation functions is shown in Tables 1 through 3 and FIGS. 6A through 6E.

TABLE 1

| | Variable | $k\Delta r$ | $\rho'$ | $\mu_1$ | $\rho$ | $\mu_2$ | $\rho''$ |
|---|---|---|---|---|---|---|---|
| Wheel | Population mean | 2.0 | 0.7 | 7.0 | 0.5 | 7.0 | 0.3 |
| | Variable | $f_0$ | $\rho'$ | $m_1$ | $\rho$ | $m_2$ | $\rho''$ |
| Tire | Population mean | 8.6 | 0.5 | 15.0 | 0.4 | 15.0 | 0.6 |

Tables 2 and 3 show means of simulation results of unbalance matching of the wheel and the tire.

TABLE 2

| | $n_1$ | $n_1 + n_2$ | RFV primary |
|---|---|---|---|
| Strategy 1 Minimalization of $n_1 + n_2$ | | | |
| Mean | 11.19 | 21.11 | 7.77 |
| Strategy 2 Minimalization of $n_1$ | | | |
| Mean | 9.24 | 23.60 | 7.82 |
| Strategy 3 RFV primary matching | | | |
| Mean | 14.64 | 29.10 | 6.23 |
| Strategy 4 Random assembling | | | |
| Mean | 16.85 | 32.42 | 8.64 |

TABLE 3

| | $n_1 + n_2$ | RFV primary |
|---|---|---|
| Minimalization of $n_1 + n_2$ | 21.11 | 7.77 |
| Minimalization of $n_1$ | 23.60 | 7.82 |
| RFV primary matching | 29.10 | 6.23 |
| Random Assembling | 32.42 | 8.64 |

Table 1 shows a detail of the model of random vectors and Table 2 shows results to which the aforementioned evaluation functions are applied. Table 2 shows means when Strategies 1 through 3 and no strategy are effected using data in Table 1. Strategy 1 shows means of simulation results (values which will be obtained at the time of measurement are predicted) of the assembled unit in which the assembling angle $\theta$ is determined using the evaluation function A (minimalization of $n_1$ and $n_2$) and then the tire and the wheel are assembled. Further, Strategy 2 shows means of simulation results of the assembled unit in which the assembling angle $\theta$ is determined using the evaluation function B (minimalization of $n_1$) and then the tire and the wheel are assembled. Moreover, Strategy 3 shows means of simulation results of the assembled unit in which the assembling angle $\theta$ is determined using the evaluation function E (matching of RFV primary amplitude f) and then the tire and the wheel are assembled. No strategy shows means of simulation results of the assembled unit in which the assembling angle $\theta$ is determined at random and then the tire and the wheel are assembled.

Figure 6A:
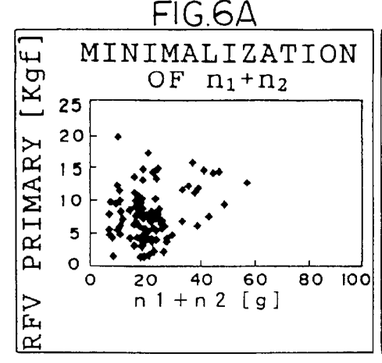
FIG. 6A corresponds to Strategy 1 and shows the dispersion of simulation results of an assembled unit in which the tire and the wheel were assembled with the assembling angle θ determined using an evaluation function A (minimalization of $n_1+n_2$).
Figure 6B:
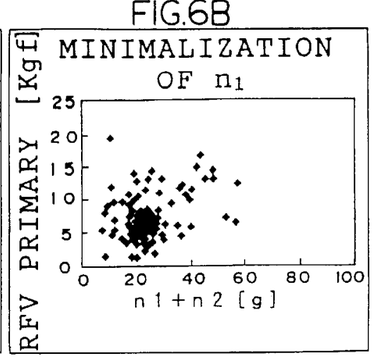
FIG. 6B corresponds to Strategy 2 and shows the dispersion of simulation results of an assembled unit in which the tire and the wheel were assembled with the assembling angle θ determined using an evaluation function B (minimalization of $n_1$).
Figure 6C:
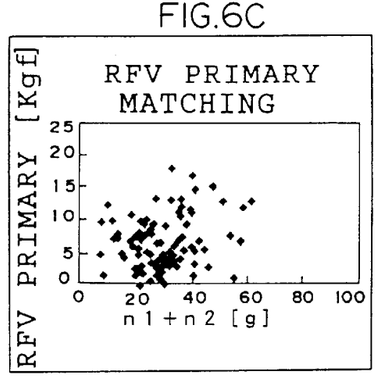
FIG. 6C corresponds to Strategy 3 and shows the dispersion of simulation results of an assembled unit in which the tire and the wheel were assembled with the assembling angle θ determined using an evaluation function E (matching of RFV primary amplitude f).
Figure 6D:
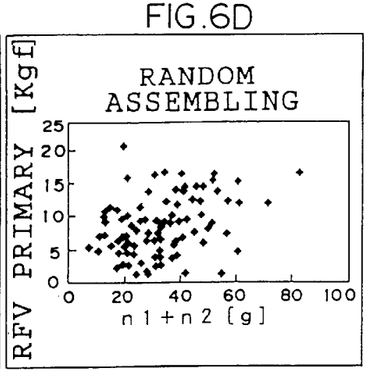
FIG. 6D corresponds to no strategy and shows the dispersion of simulation results of an assembled unit in which the tire and the wheel were assembled with the assembling angle θ determined at random without using an evaluation function.

FIGS. 6A through 6E show the dispersions in the above-described respective strategies. In FIGS. 6A through 6E, the simulation results of a plurality of assembled tire and wheel unit are shown as dispersions of dots with the abscissa being the total amount of unbalance weight to be corrected ($n_1+n_2$) at the front and reverse sides of the assembled wheel and the ordinate being an RFV primary amplitude L FIG. 6A corresponds to Strategy 1 and shows the simulation results for an assembled unit in which the assembling angle $\theta$ is determined using the evaluation function A (minimalization of $n_1$ and $n_2$) and the tire and the wheel are then assembled. Further, FIG. 6B corresponds to Strategy 2 and shows the simulation results for an assembled unit in which the assembling angle $\theta$ is determined using the evaluation function B (minimalization of $n_1$) and the tire and the wheel are then assembled. Moreover, FIG. 6C corresponds to Strategy 3 and shows the simulation results for an assembled unit in which the assembling angle θ is determined using the evaluation function E (matching of RFV primary amplitude f and the tire and the wheel are then assembled. FIG. 6D corresponds to no strategy and shows the simulation results for an assembled unit in which the assembling angle θ is determined at random without using the evaluation function and the tire and the wheel are then assembled.

Figure 6E:
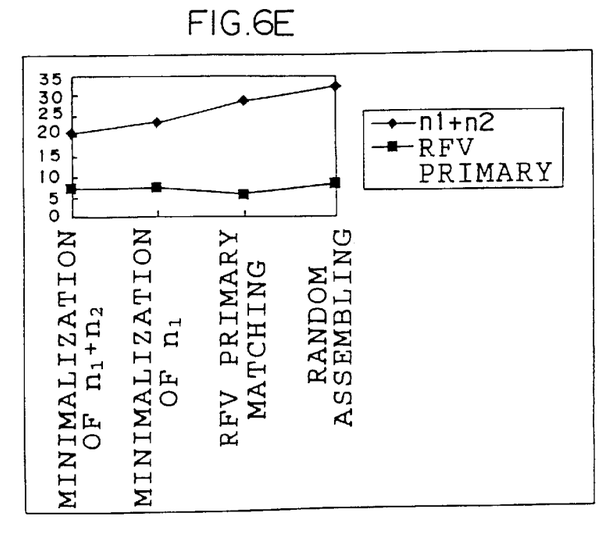
FIG. 6E shows the means of the simulation results of the respective strategies.

Table 3 and FIG. 6E show the results regarding the above-described strategies.

The simulations effected as above are one example. An arbitrary value is given to a population parameter and data of a wheel and a tire (N=100) is generated and calculated by a random number. As a result, while the total amount of balance weight per one assembled unit by effecting the assembling in accordance with a conventional RFV primary matching is 29.1 g, it is predicted that the total amount thereof by effecting the assembling which minimizes the total amount of weight ($n_1+n_2$) will be reduced to 21.1 g. The ratio of reduction is approximately 27%, and thus the effect is large. In this case, the deterioration of RFV primary is 7.77 kgf from 6.23 kgf and the ratio of deterioration is about 25%. If this deterioration is within the permissible range, a strategy which reduces weight may be taken. Further, when only the assembling which minimizes the total amount of weight ($n_1$) at the front side is carried out, it is predicted that the total amount of weight ($n_1+n_2$) is reduced to 23.6 g and the ratio of reduction is approximately 20%. The actual magnitudes of these effects depend on the magnitude of the irregularities of each wheel and tire or the directionality thereof and are not determined absolutely. However, it is obvious that the statistical characteristics of the irregularities are effective as a means of providing procedures for optimum selection.

Example of the present invention will be described in detail hereinafter.

In accordance with the above-described simulations, the difference in amounts of unbalance to be corrected due to the difference in assemblings is actually experimented using wheels and tires (sample numbers N=20).

[Data of a tire and a wheel]

magnitude of tire: 205/65R15 20 wheel: 6JJ×15 made of steel 20

First, in preparation for starting the experiment, the following items ① through ⑥ were effected.

Item ①: The unbalance of each of 20 wheels was measured by a two-plane balancer and the above-described parameters $\mu_1, \mu_2$, and $\alpha_w$ were obtained. A mark was made at the position of the unbalance mass $\mu_1$ at the front side.

Item ②: Radial direction vibrations of front and reverse bead bases of each of the 20 wheels were measured by a laser displacement meter and the average waveform of the waveforms of the front and reverse bead bases were subjected to Fourier analysis. The primary component amplitude Δr and its peak (the most protruding portion) phase angle $\beta_w$ were obtained. A mark was made at the position (the lowest portion of vibrations) 180 degrees opposite the phase angle $\beta_w$.

Item ③: The unbalance of each of 20 tires was measured by the two-plane balancer and the above-described parameters $m_1, m_2$, and $\alpha_T$ were obtained. A mark was made at the position of the unbalance mass $m_1$ at the front side.

Item ④: A single RFV of each of 20 tires was measured by a uniformity testing machine and an RFV primary component amplitude $f_0$ and the peak phase angle $\beta_T$ were obtained. A mark was made at the position of the phase angle $\beta_T$.

Item ⑤: Numbers 1 to 20 were given to each of the wheels and tires at random and the wheel and the tire having the same number were fixed as a pair for assembling.

Item ⑥: A pair No. 1 and a pair No. 2 were chosen and the position of phase angle $\beta_w$ of the wheel in the above-described item ② and the RFV primary peak position (the position of $\beta_T$) of the tire in the above described item ④ were combined and rim-assembled. The amplitude of the RFV primary component was obtained. Next, the wheel was rotated 180 degrees to the tire and reassembled, and the amplitude of the RFV primary component was measured in the same way. Since it is assumed from the model that the latter measured value is larger than the former measured value by 2kΔr, half of the difference is divided by Δr and the contribution coefficient k is identified. The mean of the contribution coefficient k of the pairs No. 1 and No. 2 is 25.3 kgf/mm. This value was used for the No. 1 to No. 20 tires as a common value.

Table 4 shows the complete obtained parameters.

TABLE 4

| # | $\mu_1$ g | $\mu_2$ g | $\alpha_W$ | Δr mm | $\beta_W$ | $m_1$ g | $m_2$ g | $\alpha_T$ | $f_0$ kgf | $\beta_T$ |
|---|---|---|---|---|---|---|---|---|---|---|
| 1 | 1 | 3 | 152 | 0.0980 | 225 | 4 | 11 | 313 | 5.6 | 2 |
| 2 | 0 | 7 | 220 | 0.0860 | 304 | 9 | 2 | 45 | 4.0 | 3 |
| 3 | 4 | 4 | 181 | 0.0602 | 43 | 31 | 26 | 9 | 7.1 | 335 |
| 4 | 9 | 4 | 152 | 0.0945 | 8 | 8 | 17 | 33 | 9.1 | 1 |
| 5 | 5 | 3 | 342 | 0.0529 | 8 | 5 | 3 | 1 | 2.9 | 156 |
| 6 | 5 | 9 | 14 | 0.0265 | 146 | 0 | 7 | 7 | 5.2 | 3 |
| 7 | 7 | 7 | 279 | 0.0825 | 88 | 17 | 17 | 4 | 6.0 | 5 |
| 8 | 2 | 0 | 33 | 0.0926 | 269 | 9 | 19 | 359 | 1.7 | 356 |
| 9 | 2 | 9 | 101 | 0.0319 | 356 | 5 | 14 | 17 | 5.6 | 8 |
| 10 | 12 | 15 | 13 | 0.1435 | 17 | 42 | 36 | 359 | 9.2 | 2 |
| 11 | 3 | 6 | 275 | 0.0741 | 67 | 16 | 16 | 13 | 5.5 | 1 |
| 12 | 8 | 8 | 0 | 0.1262 | 40 | 7 | 5 | 9 | 2.3 | 222 |
| 13 | 13 | 5 | 306 | 0.1413 | 359 | 8 | 6 | 355 | 0.8 | 357 |
| 14 | 4 | 8 | 283 | 0.0372 | 225 | 5 | 6 | 359 | 3.3 | 25 |
| 15 | 6 | 4 | 294 | 0.1289 | 38 | 5 | 4 | 226 | 6.3 | 280 |
| 16 | 4 | 5 | 304 | 0.0277 | 341 | 3 | 10 | 357 | 6.6 | 0 |
| 17 | 4 | 2 | 0 | 0.0311 | 132 | 7 | 3 | 2 | 8.6 | 9 |
| 18 | 7 | 2 | 134 | 0.0800 | 339 | 0 | 13 | 29 | 15.3 | 43 |
| 19 | 10 | 5 | 3 | 0.1228 | 36 | 23 | 19 | 7 | 9.9 | 3 |
| 20 | 5 | 8 | 3 | 0.0654 | 288 | 8 | 9 | 7 | 5.5 | 140 |

Next, as a result of optimizing the above-described representative evaluation functions using the above-described data, the results shown in Tables 5 through 8 were obtained.

TABLE 5

Minimalization of $n_1 + n_2$

| | Prediction | | | Actual measurement | | |
|---|---|---|---|---|---|---|
| Sample No. | Assembling angle | $n_1$ | $n_1 + n_2$ | RFV primary | $n_1$ | $n_1 + n_2$ | RFV primary |
| 1 | 25 | 14.8 | 21.9 | 3.2 | 14 | 21 | 3.4 |
| 2 | 180 | 1.3 | 19.8 | 6.0 | 1 | 20 | 5.5 |
| 3 | 207 | 27.3 | 56.9 | 16.0 | 27 | 51 | 15.1 |
| 4 | 181 | 1.3 | 20.0 | 7.5 | 1 | 20 | 7.1 |
| 5 | 159 | 9.9 | 11.8 | 3.9 | 10 | 12 | 4.1 |
| 6 | 148 | 6.4 | 9.1 | 5.4 | 7 | 8 | 5.6 |
| 7 | 138 | 12.2 | 25.1 | 7.4 | 12 | 25 | 7.8 |
| 8 | 209 | 16.7 | 25.9 | 13.0 | 17 | 26 | 12.4 |
| 9 | 260 | 15.0 | 19.7 | 6.4 | 14 | 20 | 6.9 |
| 10 | 188 | 29.5 | 50.6 | 6.9 | 29 | 47 | 6.9 |
| 11 | 102 | 15.8 | 27.0 | 6.9 | 16 | 26 | 6.4 |
| 12 | 178 | 0.4 | 6.1 | 5.5 | 0 | 6 | 5.3 |
| 13 | 167 | 5.4 | 17.7 | 7.5 | 6 | 19 | 7.4 |
| 14 | 118 | 4.7 | 12.7 | 13.4 | 5 | 12 | 14.4 |

TABLE 5-continued

Minimalization of $n_1 + n_2$

| | Prediction | | | Actual measurement | | |
|---|---|---|---|---|---|---|
| Sample No. | Assembling angle | $n_1$ | $n_1 + n_2$ | RFV primary | $n_1$ | $n_1 + n_2$ | RFV primary |

| Sample No. | Assembling angle | $n_1$ | $n_1 + n_2$ | RFV primary | $n_1$ | $n_1 + n_2$ | RFV primary |
|---|---|---|---|---|---|---|---|
| 15 | 188 | 1.1 | 13.8 | 8.0 | 1 | 16 | 7.8 |
| 16 | 134 | 10.2 | 15.0 | 5.9 | 10 | 14 | 6.1 |
| 17 | 189 | 3.3 | 13.9 | 8.8 | 3 | 14 | 8.8 |
| 18 | 186 | 3.3 | 16.9 | 14.7 | 3 | 15 | 14.6 |
| 19 | 182 | 13.1 | 26.8 | 6.8 | 12 | 26 | 6.3 |
| 20 | 141 | 5.0 | 6.2 | 7.2 | 5 | 6 | 6.5 |
| Mean | | 9.8 | 20.8 | 8.0 | 9.7 | 20 | 7.9 |

TABLE 6

Minimalization of $n_1$

| Sample No. | Assembling angle | $n_1$ | $n_1 + n_2$ | RFV primary | $n_1$ | $n_1 + n_2$ | RFV primary |
|---|---|---|---|---|---|---|---|
| 1 | 180 | 12.4 | 26.3 | 7.8 | 11 | 27 | 8.6 |
| 2 | 180 | 1.3 | 19.8 | 6.0 | 1 | 22 | 5.8 |
| 3 | 180 | 26.8 | 57.0 | 16.6 | 26 | 64 | 18.0 |
| 4 | 180 | 1.3 | 20.0 | 7.5 | 1 | 20 | 8.2 |
| 5 | 180 | 9.4 | 12.2 | 4.1 | 9 | 12 | 4.5 |
| 6 | 180 | 5.0 | 11.3 | 5.0 | 5 | 12 | 4.8 |
| 7 | 180 | 9.3 | 27.4 | 6.1 | 9 | 26 | 6.1 |
| 8 | 180 | 16.3 | 28.3 | 11.9 | 17 | 27 | 12.3 |
| 9 | 180 | 13.3 | 29.1 | 5.4 | 15 | 30 | 5.1 |
| 10 | 180 | 29.3 | 51.0 | 6.5 | 29 | 52 | 6.3 |
| 11 | 180 | 13.4 | 31.4 | 4.7 | 13 | 33 | 4.2 |
| 12 | 180 | 0.3 | 6.2 | 5.5 | 0 | 6 | 5.3 |
| 13 | 180 | 4.9 | 18.2 | 7.3 | 5 | 19 | 7.6 |
| 14 | 180 | 0.9 | 16.6 | 14.2 | 1 | 15 | 14.4 |
| 15 | 180 | 0.8 | 14.0 | 8.3 | 1 | 13 | 9.1 |
| 16 | 180 | 8.5 | 20.4 | 6.3 | 9 | 20 | 6.3 |
| 17 | 180 | 3.2 | 14.1 | 9.0 | 3 | 15 | 9.1 |
| 18 | 180 | 3.2 | 17.0 | 14.5 | 3 | 16 | 13.4 |
| 19 | 180 | 13.1 | 26.8 | 6.9 | 12 | 27 | 6.9 |
| 20 | 180 | 2.6 | 9.1 | 7.0 | 3 | 9 | 7.1 |
| Mean | | 9 | 22.8 | 8.0 | 9 | 23 | 8.1 |

TABLE 7

RFV Primary Matching

| Sample No. | Assembling angle | $n_1$ | $n_1 + n_2$ | RFV primary | $n_1$ | $n_1 + n_2$ | RFV primary |
|---|---|---|---|---|---|---|---|
| 1 | 33 | 14.7 | 21.9 | 3.2 | 14 | 22 | 3.3 |
| 2 | 32 | 18.1 | 25.9 | 1.9 | 18 | 25 | 2.1 |
| 3 | 248 | 29.6 | 57.0 | 15.6 | 31 | 57 | 14.9 |
| 4 | 137 | 13.9 | 34.1 | 6.7 | 14 | 34 | 6.4 |
| 5 | 32 | 19.3 | 23.4 | 1.6 | 19 | 22 | 1.6 |
| 6 | 253 | 9.9 | 23.6 | 4.5 | 10 | 23 | 4.2 |
| 7 | 263 | 17.3 | 41.8 | 3.9 | 17 | 43 | 4.0 |
| 8 | 93 | 18.9 | 43.9 | 9.4 | 20 | 41 | 9.2 |
| 9 | 107 | 14.8 | 37.5 | 4.8 | 15 | 38 | 4.4 |
| 10 | 145 | 32.4 | 60.5 | 5.5 | 32 | 52 | 5.8 |
| 11 | 236 | 14.8 | 36.3 | 3.6 | 14 | 35 | 4.2 |
| 12 | 358 | 15.1 | 27.2 | 0.9 | 16 | 27 | 1.0 |
| 13 | 182 | 4.9 | 18.4 | 7.3 | 5 | 19 | 7.2 |

TABLE 7-continued

RFV Primary Matching

| Sample No. | Assembling angle | $n_1$ | $n_1 + n_2$ | RFV primary | $n_1$ | $n_1 + n_2$ | RFV primary |
|---|---|---|---|---|---|---|---|
| 14 | 20 | 8.9 | 25.6 | 12.3 | 8 | 29 | 11.5 |
| 15 | 298 | 9.2 | 21.4 | 3.0 | 9 | 22 | 3.0 |
| 16 | 121 | 11.0 | 15.8 | 5.9 | 10 | 17 | 5.9 |
| 17 | 293 | 9.7 | 22.0 | 7.8 | 11 | 21 | 8.4 |
| 18 | 116 | 9.3 | 24.5 | 13.3 | 10 | 24 | 14.1 |
| 19 | 193 | 13.5 | 27.3 | 6.7 | 13 | 27 | 7.2 |
| 20 | 328 | 12.7 | 29.9 | 3.9 | 13 | 30 | 4.3 |
| Mean | | 15 | 30.9 | 6.1 | 15 | 30 | 6.1 |

TABLE 8

Static Unbalance Matching

| Sample No. | Assembling angle | $n_1$ | $n_1 + n_2$ | RFV primary | $n_1$ | $n_1 + n_2$ | RFV primary |
|---|---|---|---|---|---|---|---|
| 1 | 340 | 14.8 | 23.0 | 4.6 | 14 | 24 | 4.3 |
| 2 | 114 | 10.4 | 26.5 | 4.3 | 10 | 28 | 4.3 |
| 3 | 120 | 29.0 | 58.0 | 18.1 | 24 | 62 | 19.4 |
| 4 | 171 | 3.3 | 22.5 | 7.2 | 3 | 23 | 7.7 |
| 5 | 163 | 9.7 | 11.8 | 3.9 | 10 | 12 | 4.3 |
| 6 | 166 | 5.3 | 9.9 | 5.2 | 5 | 10 | 4.2 |
| 7 | 137 | 12.2 | 25.1 | 7.4 | 12 | 25 | 7.7 |
| 8 | 206 | 16.6 | 25.9 | 12.9 | 17 | 26 | 11.3 |
| 9 | 261 | 15.0 | 19.7 | 6.4 | 14 | 18 | 7.4 |
| 10 | 188 | 29.5 | 50.6 | 6.9 | 29 | 51 | 6.7 |
| 11 | 113 | 15.2 | 27.1 | 6.7 | 16 | 25 | 6.4 |
| 12 | 162 | 2.4 | 6.7 | 5.4 | 2 | 6 | 6.4 |
| 13 | 168 | 5.3 | 17.7 | 7.4 | 5 | 17 | 7.7 |
| 14 | 127 | 4.1 | 12.9 | 13.6 | 4 | 12 | 13.6 |
| 15 | 178 | 0.9 | 14.1 | 8.4 | 1 | 14 | 8.5 |
| 16 | 137 | 10.0 | 15.0 | 5.9 | 10 | 14 | 6.9 |
| 17 | 193 | 3.4 | 14.0 | 8.8 | 3 | 14 | 8.5 |
| 18 | 180 | 3.2 | 17.0 | 14.5 | 3 | 18 | 14.9 |
| 19 | 181 | 13.1 | 26.8 | 6.8 | 12 | 25 | 7.4 |
| 20 | 159 | 3.5 | 7.1 | 7.2 | 3 | 7 | 7.4 |
| Mean | | 10 | 21.6 | 8.1 | 10 | 22 | 8.3 |

The following Table 9 shows means which are the results of the experiment in the above embodiment in which the wheel and the tire (N=20) are assembled.

TABLE 9

| | Prediction | | | Actual Measurement | | |
|---|---|---|---|---|---|---|
| | $n_1$ | $n_1 + n_2$ | RFV primary | $n_1$ | $n_1 + n_2$ | RFV primary |
| Minimalization of $n_1 + n_2$ | 9.8 | 20.8 | 8.0 | 10 | 20 | 7.9 |
| Minimalization of $n_1$ | 8.8 | 22.8 | 8.0 | 9 | 23 | 8.1 |
| RFV primary matching | 14.9 | 30.9 | 6.1 | 15 | 30 | 6.1 |
| Static unbalance matching | 10 | 21.6 | 8.1 | 10 | 22 | 8.3 |

As can be understood from this Table 9, it was confirmed that the predictions and the actual measurements were nearly the same and the optimization of evaluation functions in the prediction was actually realized.

As described hereinbefore, in accordance with the first aspect of the present invention, the tire and the wheel are assembled at the predicted angle obtained from the evaluation functions on the basis of the magnitude and the position of each of the amounts of unbalance of the tire and the wheel. Thus, even if iron whose specific gravity is smaller than that of lead which has been conventionally used is used, the amount of unbalance itself can be reduced. Accordingly, a superior effect is achieved in that unbalance can be corrected without increasing the volume of the iron used.

In accordance with the second aspect of the present invention, the predicted angle for assembling the tire and the wheel is obtained on the basis of the magnitude and the position of each of the amounts of unbalance on the axial direction end surfaces of the tire and the axial direction end surfaces of the wheel using the evaluation functions including the phase angle at the time of assembling the tire and the wheel, and the tire and the wheel are assembled at the predicted angle. Thus, even if iron whose specific gravity is smaller than that of lead which has been conventionally used is used, the amount of unbalance itself can be reduced. Accordingly, a superior effect is achieved in that unbalance can be corrected without increasing the volume of the iron used.

In accordance with the third aspect of the present invention, the magnitude of an amount of static unbalance to be corrected after the tire and the wheel are assembled is used for the evaluation function. Thus, a superior effect is achieved in that the predicted angle of the wheel and the tire which can reduce the magnitude of a balance weight can be obtained and that the magnitude of the balance weight for correcting the unbalance can be reduced by reducing the amount of unbalance to be corrected to as small an amount as possible.

In accordance with the fourth aspect of the present invention, the magnitude of at least one of the amounts of unbalance to be corrected on the axial direction end surfaces of the wheel after the tire and the wheel are assembled is used for the evaluation function. Thus, a superior effect is achieved in that the magnitude of the balance weight for correcting the unbalance can be reduced by reducing the amount of unbalance to be corrected to as small an amount as possible.

In accordance with the fifth aspect of the present invention, the physical amount of unbalance includes the physical amount relating to the radial direction vibrations of the tire and the physical amount relating to the radial direction vibrations of the wheel, and evaluation is made by the physical amounts relating to the radial direction vibrations of the tire and the wheel after the tire and the wheel are assembled. Thus, a superior effect is achieved in that it is easy to assemble the wheel and the tire in consideration of the reduction of RFV.

In accordance with the sixth aspect of the present invention, evaluation is made by the sum of the physical amount of the magnitude of at least one of the amounts of unbalance correction on the axial direction end surfaces of the wheel after the wheel and the tire are assembled and a weight is attached thereto, and the physical amount relating to the radial direction vibrations of the wheel and the tire after the wheel and the tire are assembled and a weight is attached thereto. Thus, a superior effect is achieved in that, since the relationship at the time of assembling of the wheel and the tire is properly evaluated by the linear sum of amounts of unbalance, a balance weight or the like can be made as small as possible and the optimum phase angle for assembling the wheel and the tire can be obtained.

In accordance with the seventh aspect of the present invention, evaluation is made in a predetermined relationship by the physical amount of the magnitude of at least one of the amounts of unbalance correction on the axial direction end surfaces of the wheel after the wheel and the tire are assembled and a weight is attached thereto, and the physical amount relating to the radial direction vibrations of the wheel and the tire after the wheel and the tire are assembled and a weight is attached thereto. Thus, a superior effect is achieved in that a balance weight or the like can be made as small as possible and that the more optimum phase angle can be obtained.

In accordance with the eighth aspect of the present invention, a superior effect is achieved in that the wheel, to which the valve for intaking air is attached, can be used and that the optimum phase angle for assembling the tire and the wheel, to which the actual valve for intaking is attached, can be obtained.

What is claimed is:

1. A method of assembling a tire and a wheel, comprising:
   selecting a predetermined evaluation function based on a physical amount of unbalance which includes a magnitude and a position of an amount of unbalance of a tire and a magnitude and a position of an amount of unbalance of a wheel for assembling with the tire, wherein the predetermined evaluation function allows evaluation of a degree of balance in a particular manner at given phase angles between the tire and the wheel at the time of assembly;
   predicting evaluation function values at the given phase angles;
   obtaining a predicted angle for assembling the tire and the wheel which angle gives the optimum value of the predicted evaluation function values; and
   assembling the tire and the wheel at the predicted angle;
   wherein the step of selecting a predetermined evaluation function predicts and utilizes, at the time of assembling the wheel and tire at the given phase angles ($\theta$), at least one of the amount of unbalance weight to be corrected ($n_1$) at the front side of the assembled wheel, the amount of unbalance weight to be corrected ($n_2$) at the reverse side of the assembled wheel, and the amplitude of a radial force variation (RFV) primary component.

2. A method of assembling a tire and a wheel, comprising:
   selecting a predetermined evaluation function based on a physical amount of unbalance which includes a magnitude of an amount of unbalance on the axial direction end surfaces of a tire, a position of an amount of unbalance on the periphery of the end surface of the tire, a magnitude of an amount of unbalance on the axial direction end surfaces of a wheel for assembling with the tire, and a position of an amount of unbalance on the periphery of the end surface of the wheel, wherein the predetermined evaluation function allows evaluation of a degree of balance in a particular manner at given phase angles between the tire and the wheel at the time of assembly;
   predicting evaluation function values at the given phase angles;
   obtaining a predicted angle for assembling the tire and the wheel which angle gives the optimum value of the predicted evaluation function values; and assembling the tire and the wheel at the predicted angle;

wherein the step of selecting a predetermined evaluation function predicts and utilizes, at the time of assembling the wheel and tire at the given phase angles ($\theta$), at least one of the amount of unbalance weight to be corrected ($n_1$) at the front side of the assembled wheel, the amount of unbalance weight to be corrected ($n_2$) at the reverse side of the assembled wheel, and the amplitude of a radial force variation (RFV) primary component.

* * * * *